US011978392B1

(12) United States Patent
Chiu et al.

(10) Patent No.: US 11,978,392 B1
(45) Date of Patent: May 7, 2024

(54) FAST PRECHARGE METHOD AND CIRCUIT WITH MISMATCH CANCELLATION

(71) Applicant: NOVATEK Microelectronics Corp., Hsin-Chu (TW)

(72) Inventors: Min-Yang Chiu, Taichung (TW); Yu-Sheng Ma, Taichung (TW); Jin-Yi Lin, Kaohsiung (TW); Hsuan-Yu Chen, Hsinchu (TW); Jhih-Siou Cheng, New Taipei (TW); Chun-Fu Lin, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/203,652

(22) Filed: May 31, 2023

(51) Int. Cl.
*G09G 3/00* (2006.01)
*G09G 3/32* (2016.01)

(52) U.S. Cl.
CPC ....... *G09G 3/32* (2013.01); *G09G 2310/0248* (2013.01); *G09G 2310/0272* (2013.01); *G09G 2310/0291* (2013.01); *G09G 2310/08* (2013.01)

(58) Field of Classification Search
CPC ......... G09G 2310/0248; G09G 3/3648; G09G 3/3688
See application file for complete search history.

(56) References Cited

U.S. PATENT DOCUMENTS

| | | | | |
|---|---|---|---|---|
| 2001/0008400 | A1 * | 7/2001 | Moriwaki | G09G 5/393 345/554 |
| 2008/0122777 | A1 * | 5/2008 | Kuo | G09G 3/3688 345/98 |

* cited by examiner

*Primary Examiner* — Insa Sadio
(74) *Attorney, Agent, or Firm* — Winston Hsu

(57) ABSTRACT

A precharge method for a data driver includes steps of: outputting a display data to a plurality of output terminals of the data driver; outputting a second precharge voltage to an output terminal among the plurality of output terminals prior to outputting the display data to the output terminal, to precharge the output terminal to a voltage level closer to an output voltage; and outputting a first precharge voltage to the output terminal prior to outputting the second precharge voltage. The first precharge voltage provides a faster voltage transition on the output terminal than the second precharge voltage.

22 Claims, 9 Drawing Sheets

FAST PRECHARGE METHOD AND CIRCUIT WITH MISMATCH CANCELLATION

BACKGROUND OF THE INVENTION

1. Field of the Invention

The present invention relates to a precharge method and circuit, and more particularly, to a precharge method and circuit capable of fast precharge and mismatch cancellation.

2. Description of the Prior Art

Light-emitting diodes (LEDs) are widely used in displays of electronic devices such as television screens, computer monitors, portable systems such as mobile phones, handheld game consoles and personal digital assistants. A LED panel is usually driven by using a pulse width modulation (PWM) technique, to determine the brightness of each pixel according to the turn-on time of the driving channel. With the trends of increasing panel size and resolution, the number of LED pixels to be driven by a driving channel increases and increases, resulting in a heavier load of the display data driver.

SUMMARY OF THE INVENTION

It is therefore an objective of the present invention to provide a novel precharge method and circuit, in order to solve the abovementioned problems.

An embodiment of the present invention discloses a precharge method for a data driver. The precharge method comprises steps of: outputting a display data to a plurality of output terminals of the data driver; outputting a second precharge voltage to an output terminal among the plurality of output terminals prior to outputting the display data to the output terminal, to precharge the output terminal to a voltage level closer to an output voltage; and outputting a first precharge voltage to the output terminal prior to outputting the second precharge voltage. Wherein, the first precharge voltage provides a faster voltage transition on the output terminal than the second precharge voltage.

Another embodiment of the present invention discloses a precharge circuit of a data driver. The data driver outputs a display data to a plurality of output terminals of the data driver. The precharge circuit comprises a plurality of precharge units, each of which comprises an operational amplifier and a fast precharge circuit. The operational amplifier outputs a second precharge voltage to an output terminal among the plurality of output terminals prior to the data driver outputting the display data to the output terminal. The fast precharge circuit, coupled to the operational amplifier, outputs a first precharge voltage to the output terminal prior to the operational amplifier outputting the second precharge voltage.

Another embodiment of the present invention discloses a precharge circuit of a data driver. The data driver outputs a display data to a plurality of output terminals of the data driver. The precharge circuit comprises a plurality of precharge units, each of which comprises an operational amplifier. The operational amplifier outputs a precharge voltage to an output terminal among the plurality of output terminals in a first configuration and then outputs the precharge voltage to the output terminal in a second configuration, prior to the data driver outputting the display data to the output terminal. Wherein, a driving capability of the operational amplifier in the first configuration is higher than the driving capability of the operational amplifier in the second configuration.

Another embodiment of the present invention discloses a precharge circuit of a data driver. The data driver outputs a display data to a plurality of output terminals of the data driver. The precharge circuit comprises a plurality of precharge units, each of which comprises an operational amplifier and a mismatch cancellation circuit. The operational amplifier outputs a precharge voltage to an output terminal among the plurality of output terminals prior to the data driver outputting the display data to the output terminal. The mismatch cancellation circuit, coupled to the operational amplifier, cancels a mismatch of the operational amplifier between the plurality of precharge units.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
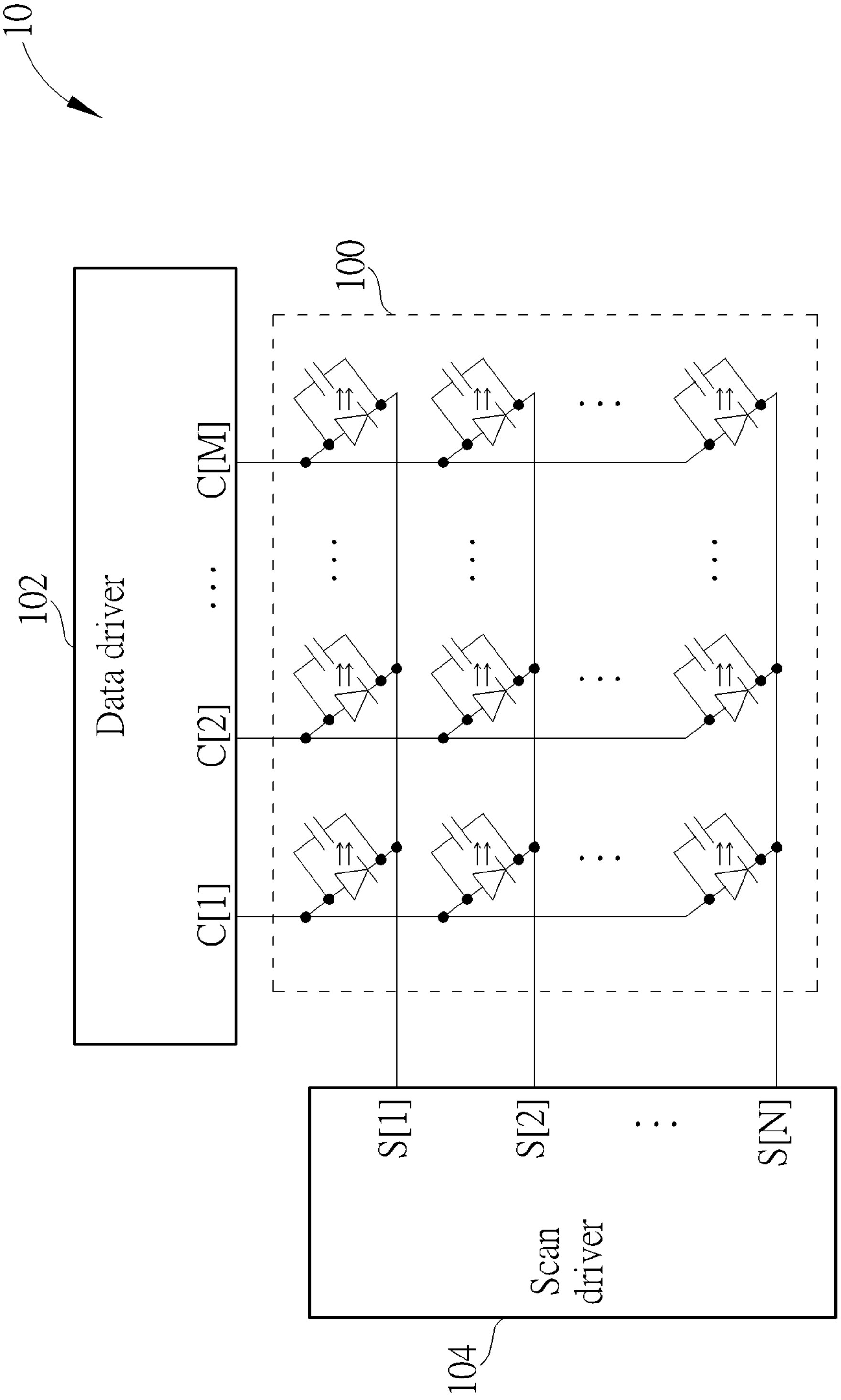
FIG. 1 is a schematic diagram of a display system according to an embodiment of the present invention.

FIG. 1 is a schematic diagram of a display system 10 according to an embodiment of the present invention. The display system 10 includes a display panel 100, a data driver 102 and a scan driver 104. The display panel 100 may be a light-emitting diode (LED) panel, in which a plurality of LED pixels are arranged as an array. The display panel 100 has a plurality of scan lines and a plurality of data lines, and each LED pixel may have a LED coupled between one of the scan lines and one of the data lines.

The data lines are coupled to the data driver 102, which is configured to send display data to the display panel 100 through the corresponding data lines. The display data may be in the form of driving currents output with a timing based on pulse width modulation (PWM) control. As shown in FIG. 1, the data driver 102 is coupled to the display panel 100 through output terminals C[1]-C[M] (where M is a positive integer), and each output terminal C[1]-C[M] is coupled to a data line of the display panel 100 to be coupled to a column of LED pixels. In another embodiment, each output terminal may be coupled to multiple data lines through a switch, and may output display data to different data lines time-divisionally.

The scan lines are coupled to the scan driver 104, which is configured to sequentially scan the scan lines, allowing the display data to be delivered to the LED pixels on the scan lines, thereby emitting light with desired brightness. As shown in FIG. 1, the scan driver 104 is coupled to the display panel 100 through scan terminals S[1]-S[N] (where N is a positive integer), and each scan terminal S[1]-S[N] is coupled to a scan line of the display panel 100 to be coupled to a row of LED pixels.

As shown in FIG. 1, each LED pixel is accompanied by a parasitic capacitor. Conventionally, the driving current of the display data may charge the parasitic capacitors on the data line when it is output to the display panel 100, and the charging behavior may cause voltage variations on the data lines, resulting in a color cast on the display panel 100. In order to solve the color cast problem, a precharge operation may be performed before the display data is output. In other words, partial display time in a display line period (i.e., a period allocated to output a row data) should be used for outputting a precharge voltage. This compresses the time for outputting the display data.

Figure 2:
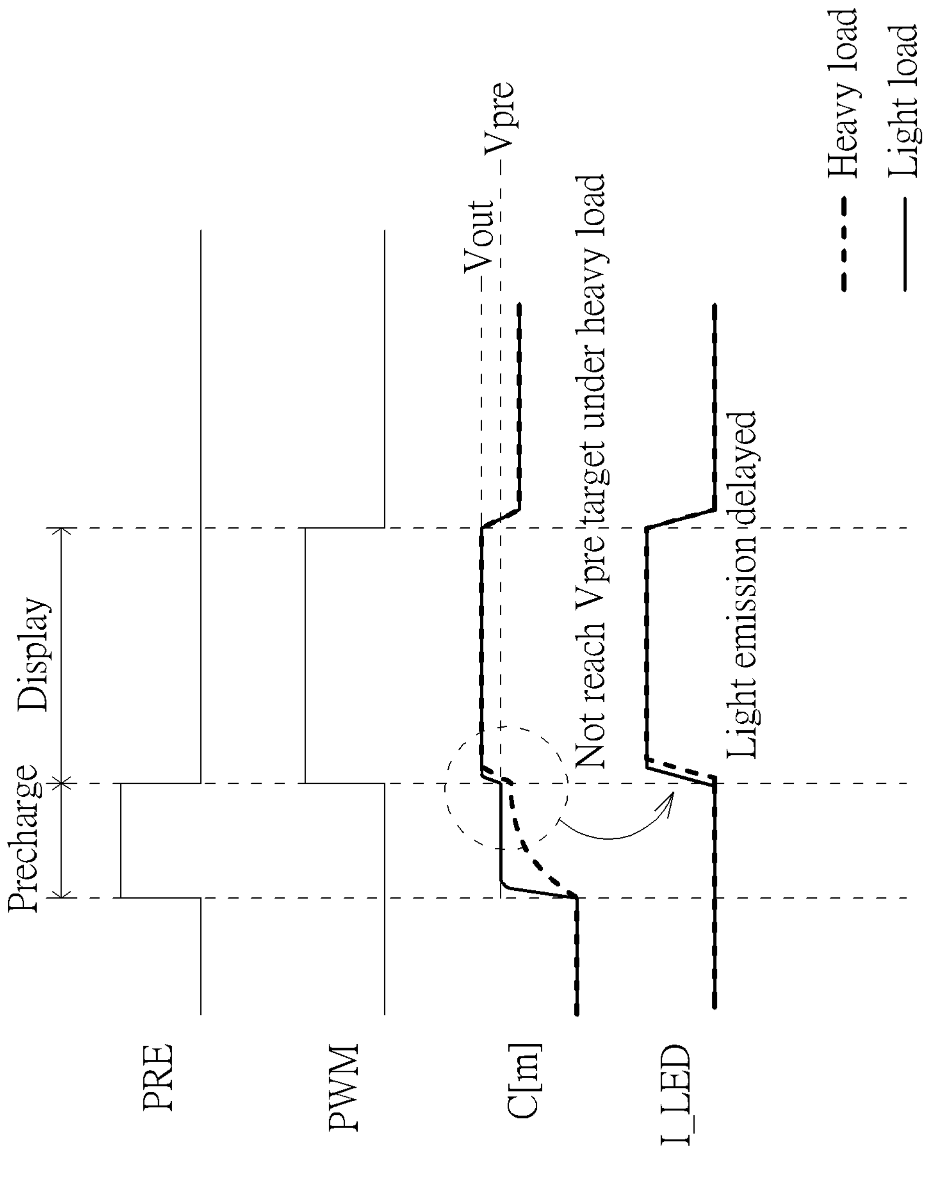
FIG. 2 is a waveform diagram of a precharge operation performed by the data driver.

FIG. 2 is a waveform diagram of a precharge operation performed by the data driver 102. In detail, FIG. 2 shows the waveforms of a precharge control signal PRE, a PWM control signal PWM, the voltage at the output terminal C[m], and the driving current I_LED output from the output terminal C[m], where m may be any integer from 1 to M; namely, the precharge operation may be performed on any output terminal C[1]-C[M] of the data driver 102.

As shown in FIG. 2, a display line period may include a precharge phase and a display phase. The precharge control signal PRE may indicate the precharge phase for outputting a precharge voltage Vpre. The PWM control signal PWM may indicate the time length for outputting the driving current I_LED, where the pulse width of the PWM control signal PWM corresponds to the brightness to be shown on the target LED pixel receiving the driving current I_LED.

FIG. 2 shows scenarios of heavy loads and light loads. Under the light-load scenario, the output terminal C[m] may reach the precharge voltage Vpre rapidly in the precharge phase. Then in the display phase, the driving current I_LED may be output when the PWM control signal PWM toggles, and the output terminal C[m] may reach an output voltage Vout when outputting the driving current I_LED, where the output voltage Vout may turn on the scanned LED pixel, allowing this LED pixel to receive the driving current I_LED to emit light. In order to solve or mitigate the abovementioned color cast problem, the precharge voltage Vpre may be closer to the output voltage Vout.

However, with the trends of increasing panel size and resolution, the number of LED pixels coupled to the data line increases and increases. In such a situation, the precharge voltage Vpre is requested to charge more and more parasitic capacitors, and this introduces a heavy load to be driven by the data driver 102. Under the heavy-load scenario, the output terminal C[m] may not reach the target precharge voltage Vpre at the end of the precharge phase. Therefore, it needs more time to reach the output voltage Vout in the display phase, such that the LED pixel may be turned on to receive the driving current I_LED later, and the light emission may be delayed abnormally. This results in that the brightness of the corresponding LED pixel cannot reach its target value.

The precharge operation may be realized by using an operational amplifier (op-amp). The op-amp may be connected with a negative feedback configuration, to be implemented as a buffer to output the precharge voltage Vpre to the output terminal C[m]. The op-amp is capable of controlling the output terminal C[m] to reach the precharge voltage Vpre precisely, but may not drive rapidly if the output load is heavy.

Figure 3:
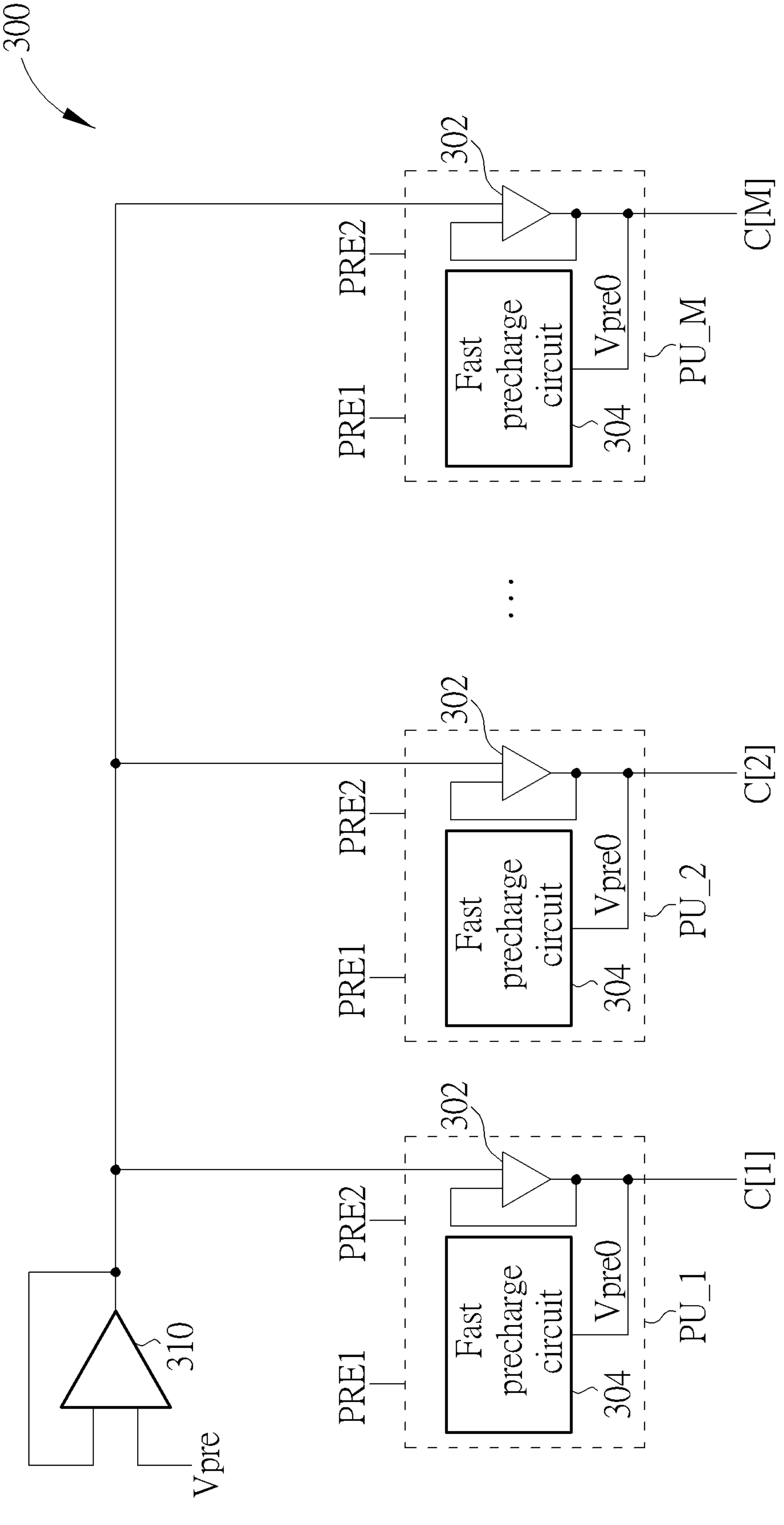
FIG. 3 is a schematic diagram of a data driver according to an embodiment of the present invention.

In order to solve this problem, the present invention provides a novel precharge method for the data driver with a fast precharge circuit. FIG. 3 is a schematic diagram of a data driver 300 according to an embodiment of the present invention. The data driver 300 may be implemented as the data driver 102 shown in FIG. 1, to drive and control the operations of the display panel 100.

As shown in FIG. 3, the data driver 300 includes a plurality of precharge units PU_1-PU_M, which are coupled to the output terminals C[1]-C[M] and configured to output the precharge voltage Vpre to the corresponding output terminals C[1]-C[M], respectively. Each of the precharge units PU_1-PU_M includes an op-amp 302 and a fast precharge circuit 304, and operates by receiving precharge control signals PRE1 and PRE2. The op-amp 302 is configured to output the precharge voltage Vpre to the output terminal C[1]-C[M]. More specifically, the op-amp 302 may receive the precharge voltage Vpre from a global op-amp 310 included in or coupled to the data driver 300. The op-amp 302 is connected with a negative feedback configuration to forward the precharge voltage Vpre to the corresponding output terminal C[1]-C[M]. The precharge voltage Vpre is output prior to the data driver 300 outputting the display data to each output terminal C[1]-C[M].

In an embodiment, the data driver 300 and the precharge units PU_1-PU_M therein are implemented in an integrated circuit (IC) included in a chip. The data driver 300 (and/or the IC) may further include other current sources and switches for performing driving current output and PWM control, and these devices are omitted in FIG. 3 without influencing the illustrations of the present embodiment.

As mentioned above, the op-amp 302 itself may not drive the output terminal C[1]-C[M] to reach the precharge voltage Vpre in time when the load on the display panel is heavier; hence, the fast precharge circuit 304 may output another precharge voltage Vpre0 prior to the op-amp 302 outputting the precharge voltage Vpre. The precharge voltage Vpre0 may provide a faster voltage transition on the output terminal C[1]-C[M] than the precharge voltage Vpre forwarded by the op-amp 302, so that the voltage at the output terminal C[1]-C[M] may reach its target precharge voltage Vpre more rapidly, especially under the heavy-load scenario.

As mentioned above, the heavy load may be generated from the data line on the display panel which is coupled to a great number of LED pixels and thus has a great number of parasitic capacitors. The display data may be output to a corresponding data line to turn on a scanned LED pixel on the data line, and the precharge voltages Vpre0 and Vpre should be output to the same data line to charge the parasitic capacitors on this data line, so that the voltage at the output terminal and the corresponding data line may rapidly reach the target voltage when the parasitic capacitors are fully charged.

Figure 4:
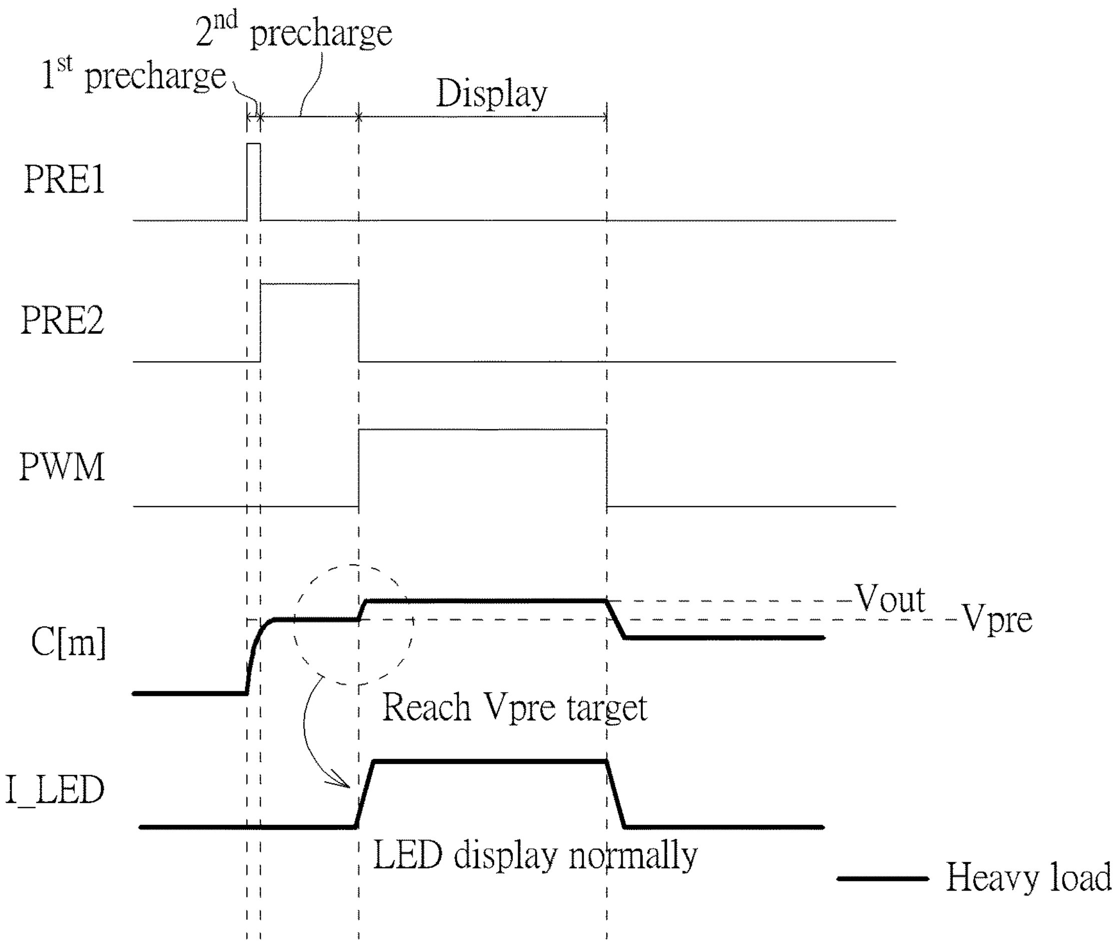
FIG. 4 is a waveform diagram of a precharge operation performed by the data driver.

FIG. 4 is a waveform diagram of a precharge operation performed by the data driver 300. In detail, FIG. 4 shows the waveforms of the precharge control signals PRE1 and PRE2, the PWM control signal PWM, the voltage at the output terminal C[m], and the driving current I_LED output from the output terminal C[m]. Similarly, m may be any integer from 1 to M, to indicate that the precharge operation may be performed on any of the output terminals C[1]-C[M] of the data driver 300.

As shown in FIG. 4, a display line period may include a first precharge phase, a second precharge phase and a display phase. The precharge control signals PRE1 and PRE2 may indicate the first precharge phase and the second precharge phase, respectively. Before the driving current I_LED (i.e., the display data) is output, the precharge voltage Vpre is output in the second precharge phase. In the first precharge phase prior to and adjacent to the second precharge phase, the precharge voltage Vpre0 is output (e.g., by the fast precharge circuit 304), to provide a faster voltage transition on the output terminal C[m], allowing the output terminal C[m] to reach the precharge voltage Vpre at the end of the precharge phase (i.e., before the beginning of the display phase) even under the heavy-load scenario. The output terminal C[m] may precisely keep at the precharge voltage Vpre under the negative feedback control of the op-amp 302. Therefore, the LED pixel may be turned on timely to receive the driving current I_LED at the beginning of the display phase, in order to display the desired brightness normally.

Figure 5:
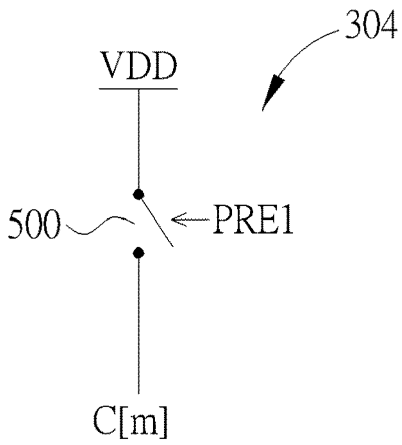
FIG. 5 illustrates an exemplary implementation of the fast precharge circuit.

The fast precharge circuit 304 of the data driver 300 may be implemented in any appropriate manner. In an embodiment, the fast precharge circuit 304 may include a switch 500, as shown in FIG. 5. The switch 500 is coupled between the output terminal C [m] and a power supply terminal. During the first precharge phase, the switch 500, which receives the precharge control signal PRE1, may be turned on to forward a power supply voltage VDD to the output terminal C[m]. The power supply voltage VDD may provide a strong driving capability to provide fast voltage transition on the output terminal C[m], to pull up the voltage at the output terminal C[m] to a higher-enough level in the first precharge phase.

Note that the implementation shown in FIG. 5 is merely an exemplary embodiment of the fast precharge circuit 304. In another embodiment, the fast precharge circuit 304 may be implemented in another manner. For example, the switch 500 may be configured to forward any other appropriate voltage different from the power supply voltage VDD. Alternatively or additionally, the fast precharge circuit 304 may include, but not limited to, a logic gate, a diode-connected transistor, a current source, and/or any other circuit device capable of rapidly supplying charges to pull the voltage at the output terminal C[m] of the data driver 300.

Also note that the fast precharge circuit aims at rapidly charging the parasitic capacitors on the data lines to drive the output terminal of the data driver to reach its target voltage in time. Similar effects may be achieved by enhancing the driving capability of the op-amp.

Figure 6:
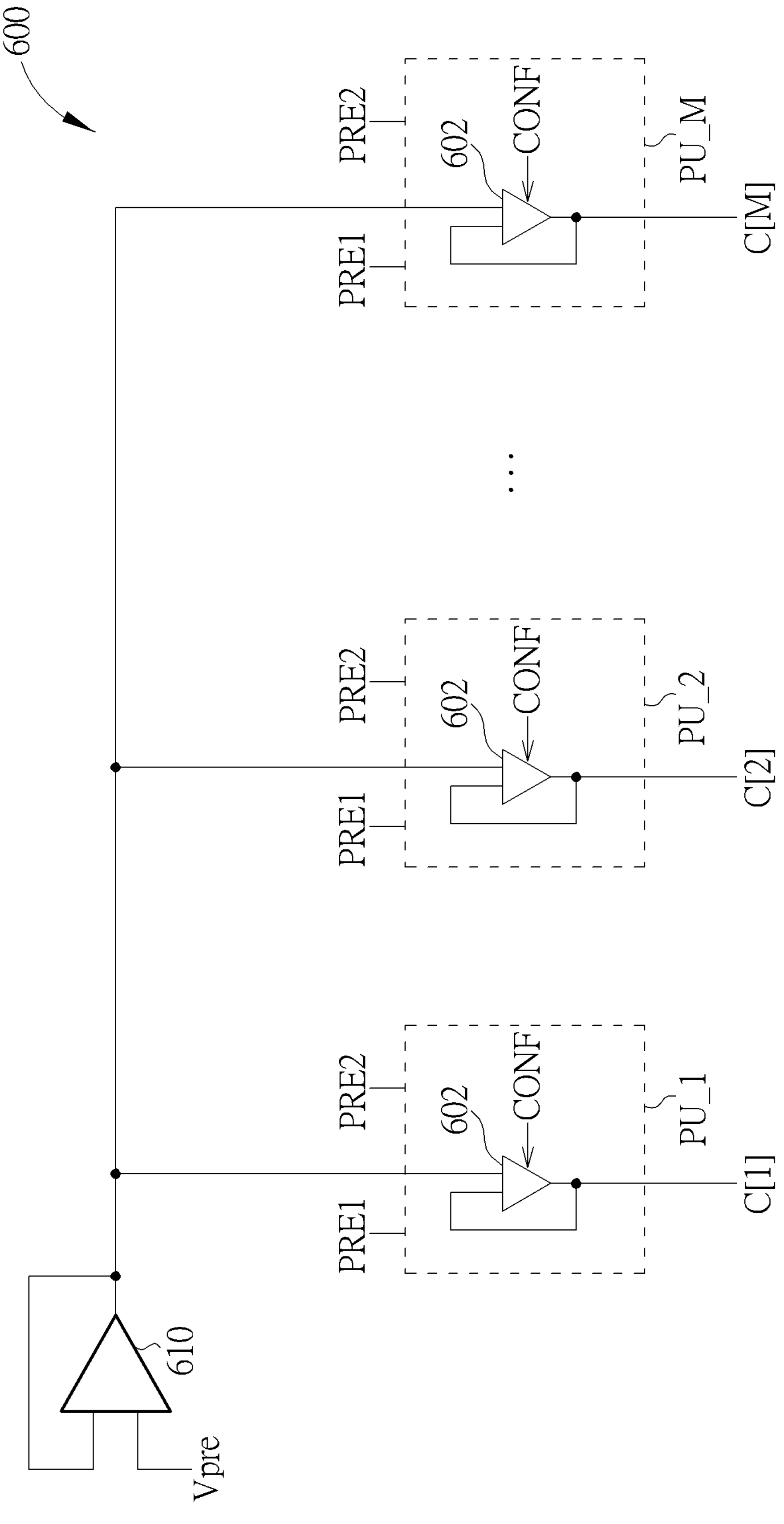
FIG. 6 is a schematic diagram of another data driver according to an embodiment of the present invention.

FIG. 6 is a schematic diagram of another data driver 600 according to an embodiment of the present invention. The data driver 600 may also be implemented as the data driver 102 shown in FIG. 1, to drive and control the operations of the display panel 100.

As shown in FIG. 6, the data driver 600 includes a plurality of precharge units PU_1-PU_M, which are coupled to the output terminals C[1]-C[M], respectively. Each of the precharge units PU_1-PU_M includes an op-amp 602, and operates by receiving precharge control signals PRE1-PRE2. The op-amp 602 is configured to output the precharge voltage Vpre to the output terminal C[1]-C[M] by receiving the precharge voltage Vpre from a global op-amp 610 included in or coupled to the data driver 600. Similarly, the op-amp 602 is connected with a negative feedback configuration to forward the precharge voltage Vpre. The op-amp 602 may be operated in a first configuration or a second configuration by receiving a configuration control signal CONF, which may be generated based on the precharge control signals PRE1-PRE2.

Referring to FIG. 6 along with FIG. 4, in the second precharge phase indicated by the precharge control signal PRE2, the op-amp 602 may be in the second configuration and output the precharge voltage Vpre with a normal driving capability. In the first precharge phase prior to the second precharge phase and indicated by the precharge control signal PRE1, the op-amp 602 may be in the first configuration and output the precharge voltage Vpre (or another precharge voltage) with a stronger driving capability which is higher than its driving capability in the second configuration.

The configuration of the op-amp 602 may be controlled in any appropriate manner. In an embodiment, the configuration control signal CONF may provide a bias voltage setting to modify the driving capability of the op-amp 602. Alternatively or additionally, the configuration control signal CONF may modify the size of transistors in the output stage of the op-amp 602, so as to increase the output current magnitude provided by the op-amp 602. In general, the power amount consumed by the op-amp 602 in the first configuration may be adjusted to be greater than the power amount consumed by the op-amp 602 in the second configuration, allowing the op-amp 602 to provide a stronger driving capability and a higher current in the first precharge phase.

In the embodiments of the present invention, the precharge voltage Vpre of the display panel is provided in multiple channels each having a precharge unit. The device/process variations of the op-amp in each precharge unit may generate an inter-channel mismatch. The inter-channel mismatch may cause that the precharge voltages Vpre output to different data lines have slightly different levels, which may generate unwanted vertical lines on the display panel and degrade the visual effect.

Figure 7:
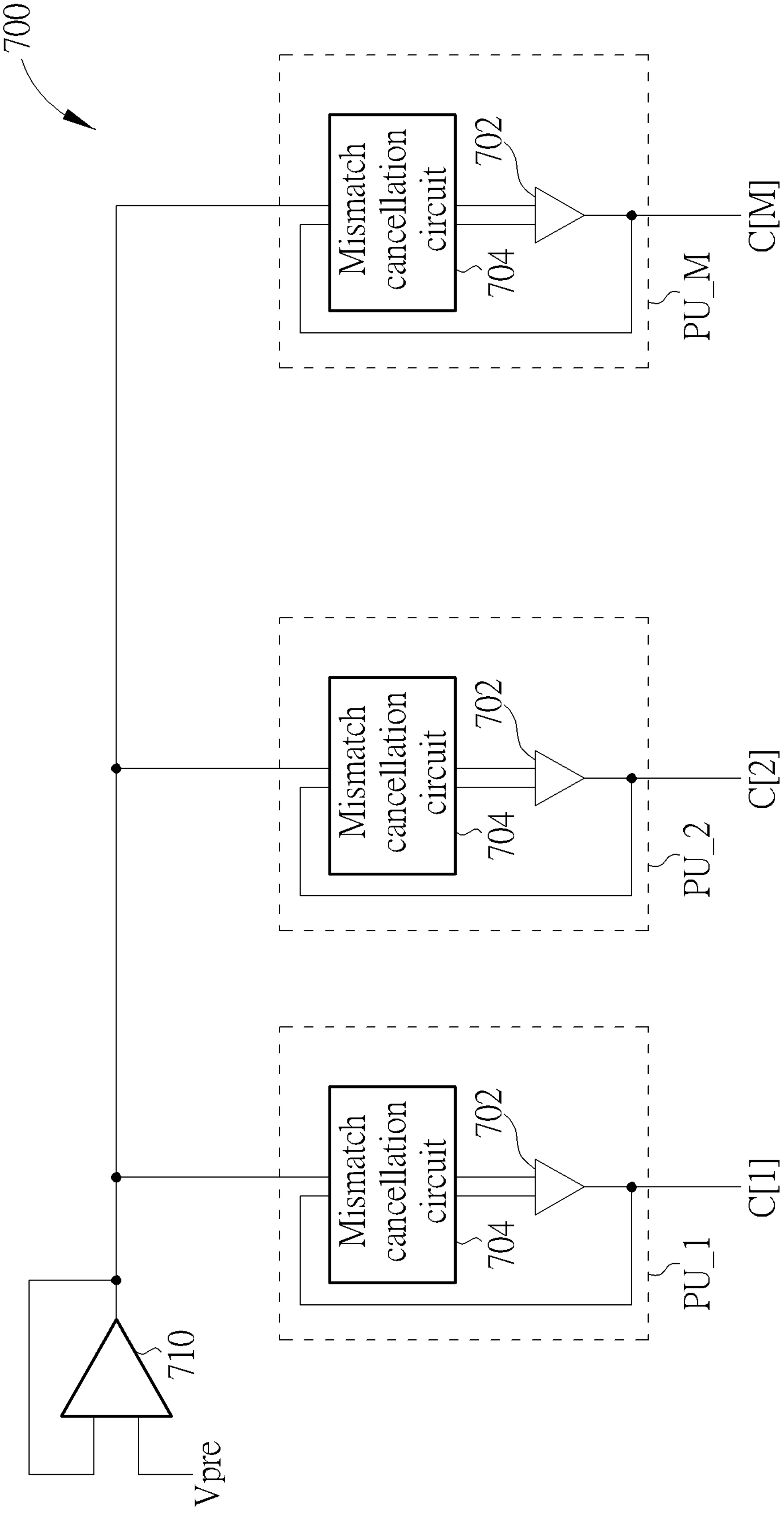
FIG. 7 is a schematic diagram of a further data driver according to an embodiment of the present invention.

In an embodiment, a mismatch cancellation circuit may be applied to solve this problem. FIG. 7 is a schematic diagram of a further data driver 700 according to an embodiment of the present invention. The data driver 700 may also be implemented as the data driver 102 shown in FIG. 1, to drive and control the operations of the display panel 100.

As shown in FIG. 7, the data driver 700 includes a plurality of precharge units PU_1-PU_M, which are coupled to the output terminals C[1]-C[M] and configured to output the precharge voltage Vpre to the corresponding output terminals C[1]-C[M], respectively. Each of the precharge units PU_1-PU_M includes an op-amp 702 and a mismatch cancellation circuit 704. The op-amp 702 is configured to output the precharge voltage Vpre to the output terminal C[1]-C[M] by receiving the precharge voltage Vpre from a global op-amp 710 included in or coupled to the data driver 700. Similarly, the op-amp 702 is connected with a negative feedback configuration to forward the precharge voltage Vpre. The precharge voltage Vpre may be output prior to the data driver 700 outputting the display data to the corresponding output terminal C[1]-C[M].

The mismatch cancellation circuit 704 may be coupled to the input terminals of the op-amp 702. More specifically, the mismatch cancellation circuit 704 is coupled to the positive input terminal, the negative input terminal and the output terminal of the op-amp 702, and a voltage input terminal which is coupled to the output terminal of the global op-amp 710. Therefore, the input channel of the op-amp 702 for receiving voltage from the front-end device may pass through the mismatch cancellation circuit 704, and the negative feedback channel between the negative input terminal and the output terminal of the op-amp 702 may also pass through the mismatch cancellation circuit 704. With the connection manner, the mismatch cancellation circuit 704 is capable of canceling the offset between the positive input terminal and the negative input terminal of the op-amp 702.

Since the input offset of the op-amp 702 in each precharge unit PU_1-PU_M is canceled, the inter-channel mismatch between different channels may thereby be canceled or mitigated. In such a situation, the visual effect of the display panel may be improved.

Figure 8:
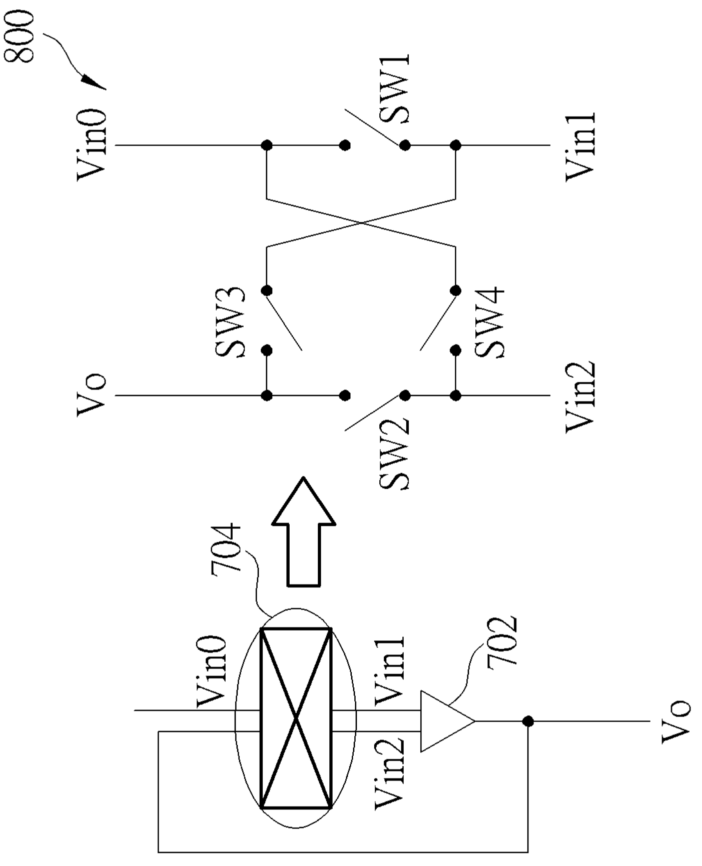
FIG. 8 illustrates an exemplary implementation of the mismatch cancellation circuit.

The mismatch cancellation circuit 704 of the data driver 700 may be implemented in any appropriate manner. In an embodiment, the mismatch cancellation circuit 704 may include a chopper circuit 800, as shown in FIG. 8. The chopper circuit 800 includes 4 switches SW1-SW4, each coupled between two of a voltage input terminal Vin0 coupled to the global op-amp 710, the input terminals Vin1 and Vin2, and the output terminal Vo of the op-amp 702. The switches SW1 and SW2 may be turned on in a first phase and the switches SW3 and SW4 may be turned on in a second phase. These switches may be turned on/off interchangeably so that the roles played by the input terminals Vin1 and Vin2 may be continuously interchanged, thereby canceling the offset between the input terminals Vin1 and Vin2.

Note that the implementation shown in FIG. 8 is merely an exemplary embodiment of the mismatch cancellation circuit 704. In another embodiment, the mismatch cancellation circuit 704 may be implemented in another manner. For example, the mismatch cancellation circuit 704 may be implemented with an auto-zeroing circuit, a trimming circuit, and/or any circuit module capable of canceling the inter-channel mismatch, but not limited thereto.

In another embodiment, a precharge voltage Vpre from an op-amp may be output to a plurality of output terminals of the data driver. For example, in any of the data drivers 300, 600 and 700, the implementations of fast precharge circuit, driving capability control, and mismatch cancellation circuit may be applied to the global op-amp 310, 610 and/or 710, while the precharge units PU_1-PU_M may be omitted. In such a situation, the precharge method and circuit of the present invention may be applied to a global op-amp which is configured to output the precharge voltage Vpre to multiple output terminals C[1]-C[M].

Figure 9:
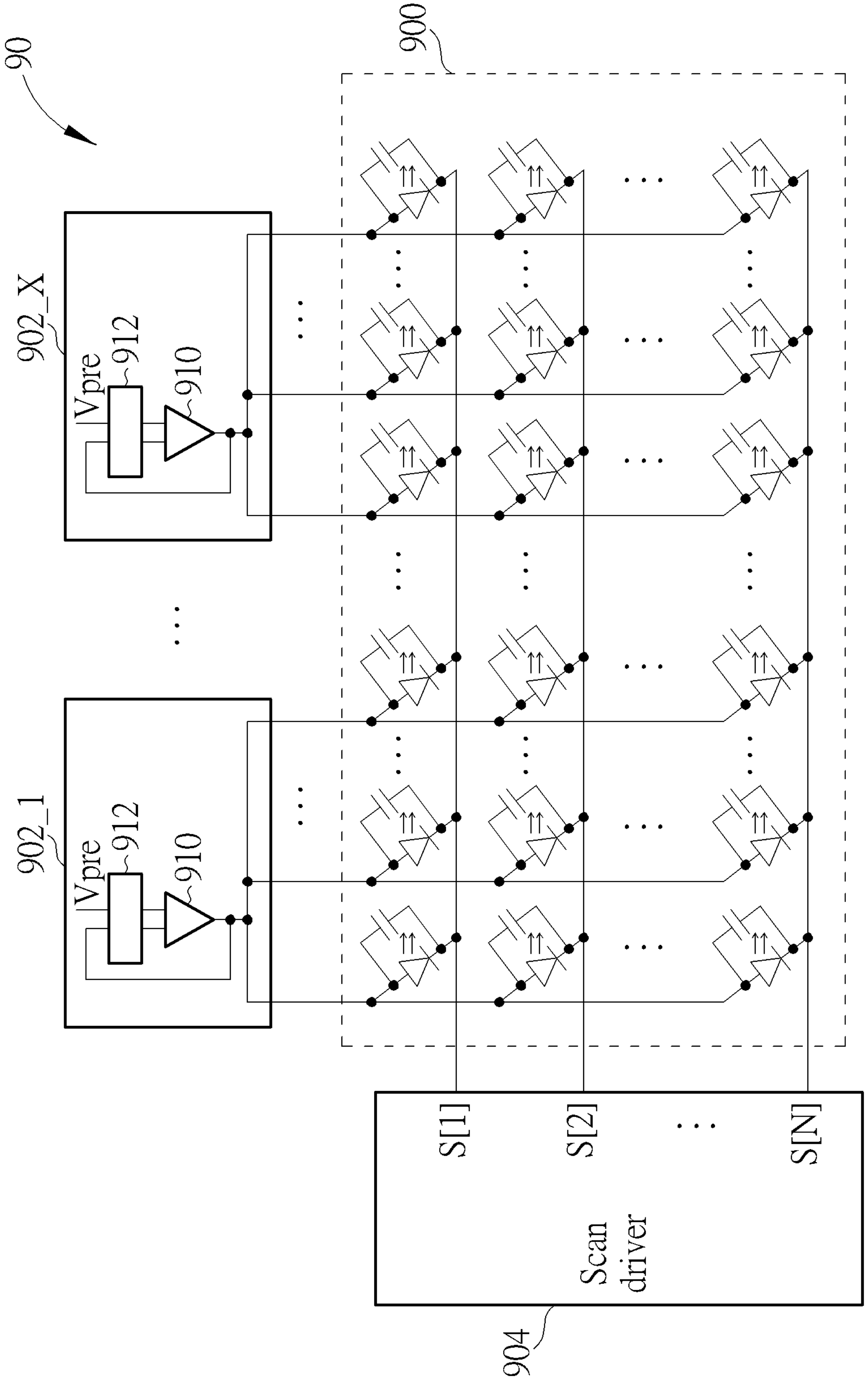
FIG. 9 is a schematic diagram of another display system according to an embodiment of the present invention.

FIG. 9 is a schematic diagram of another display system 90 according to an embodiment of the present invention. The display system 90 includes a display panel 900, multiple data drivers 902_1-902_X and a scan driver 904. The display system 90 is different from the display system 10 in that there are multiple data drivers 902_1-902_X commonly controlling and driving the display panel 900 in the display system 90. Each of the data drivers 902_1-902_X may be implemented as an IC included in a chip.

As shown in FIG. 9, each data driver 902_1-902_X may include an op-amp 910 and a mismatch cancellation circuit 912. The op-amp 910 is configured to output the precharge voltage Vpre to multiple output terminals of the corresponding data driver 902_1-902_X. The mismatch cancellation circuit 912, coupled to the input terminals of the op-amp 910, is configured to cancel the input offset of the op-amp 910, which in turn cancels the inter-chip mismatch between the data drivers 902_1-902_X.

Please note that the present invention aims at providing a novel precharge method and circuit for a display data driver. Those skilled in the art may make modifications and alterations accordingly. For example, the mismatch cancellation circuit and method may be integrated with the fast precharge circuit and method or the driving capability control scheme provided in this disclosure. In fact, the above embodiments may be integrated or combined unless otherwise specified. In addition, the timing of the precharge operations shown in FIG. 4 is merely an example for illustrating the implementations of the first precharge phase and the second precharge phase. In another embodiment, the time length of the first precharge phase and the time length of the second precharge phase may be adjusted relatively. The time length of the first/second precharge phases relative to the display phase may also be allocated in any appropriate manner. In addition, the precharge voltage may be set to any appropriate value closer to the output voltage for controlling the LED pixels to receive the display data.

Further, in the above embodiments, a current driving LED panel is taken as an example for illustrating the implementations and operations of the data driver and the related precharge method. In other embodiments, the precharge method and circuit of the present invention may be applied to various types of display panels, which include, but not limited to, a LED panel, organic LED (OLED) panel, mini-OLED panel, micro-OLED panel, and LCD panel. As long as a display panel needs to receive a precharge voltage prior to the display data, the precharge method and circuit of the present invention are applicable.

Figure 10:
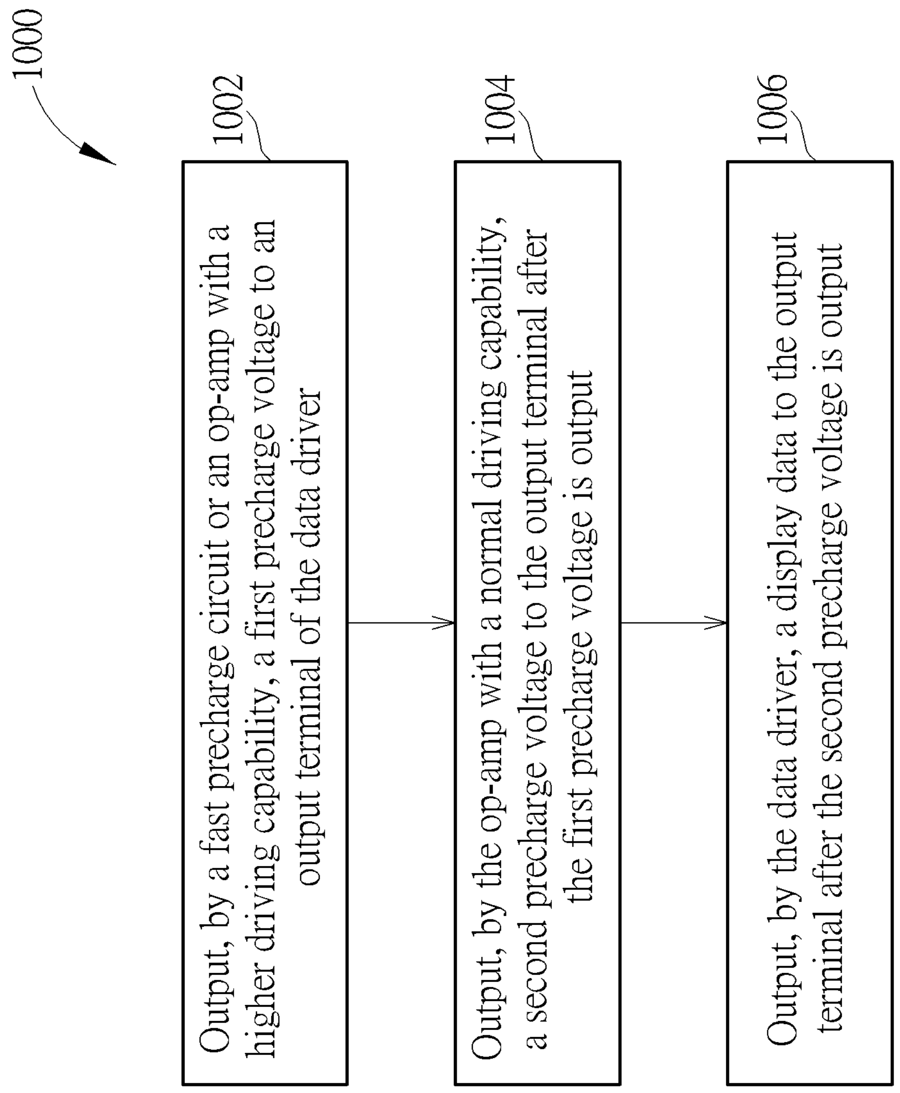
FIG. 10 is a flowchart of a precharge process according to an embodiment of the present invention.

The abovementioned precharge operations may be summarized into a precharge process 1000, as shown in FIG. 10. The precharge process 1000 may be implemented in a display data driver for driving a display panel, such as the data driver 102 shown in FIG. 1. As shown in FIG. 10, the precharge process 1000 includes the following steps:

Step 1002: Output, by a fast precharge circuit or an op-amp with a higher driving capability, a first precharge voltage to an output terminal of the data driver.

Step 1004: Output, by the op-amp with a normal driving capability, a second precharge voltage to the output terminal after the first precharge voltage is output.

Step 1006: Output, by the data driver, a display data to the output terminal after the second precharge voltage is output.

The detailed implementations and operations of the precharge process 1000 are described in the above paragraphs, and will not be narrated herein.

To sum up, the present invention provides a novel precharge method and circuit for a display data driver. Prior to the display phase where a display data is output, a first precharge phase and a second precharge phase are allocated. In the first precharge phase, a first precharge voltage is output to provide faster voltage transition. In the second precharge phase, a second precharge voltage is output to precisely drive the output terminal of the data driver and the data line of the display panel to a target level. The first precharge voltage may be provided by a fast precharge circuit or an op-amp with a higher driving capability. In an embodiment, a mismatch cancellation circuit is applied to cancel the inter-channel mismatch of the op-amp. In such a situation, the voltage at the output terminal for driving the display panel may reach its target level before the beginning of the display phase, and the inter-channel mismatch may be removed by using the mismatch cancellation scheme. As a result, the LED pixel may be turned on normally when the display phase starts, and the turn-on behavior of a row of scanned LED pixels may be consistent under the same precharge voltage between different data lines without mismatch, so as to achieve a satisfactory visual effect.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A precharge method for a data driver, comprising:

outputting a display data to a plurality of output terminals of the data driver;

outputting a second precharge voltage to an output terminal among the plurality of output terminals prior to outputting the display data to the output terminal, to precharge the output terminal to a voltage level closer to an output voltage; and outputting a first precharge voltage to the output terminal prior to outputting the second precharge voltage;

wherein the first precharge voltage provides a faster voltage transition on the output terminal than the second precharge voltage.

2. The precharge method of claim 1, wherein the first precharge voltage, the second precharge voltage and the display data are output during the same display line period.

3. The precharge method of claim 1, wherein the first precharge voltage, the second precharge voltage and the display data are output to the same data line of a display panel.

4. The precharge method of claim 1, wherein the first precharge voltage is output in a first precharge phase, and the second precharge voltage is output in a second precharge phase adjacent to the first precharge phase.

5. The precharge method of claim 1, wherein the first precharge voltage and the second precharge voltage are output by an operational amplifier of the data driver.

6. The precharge method of claim 1, wherein the first precharge voltage is output by a fast precharge circuit of the data driver, and the second precharge voltage is output by an operational amplifier of the data driver.

7. A precharge circuit of a data driver, the data driver outputting a display data to a plurality of output terminals of the data driver, the precharge circuit comprising:

a plurality of precharge units, each comprising:

an operational amplifier to output a second precharge voltage to an output terminal among the plurality of output terminals prior to the data driver outputting the display data to the output terminal; and a fast precharge circuit, coupled to the operational amplifier, to output a first precharge voltage to the output terminal prior to the operational amplifier outputting the second precharge voltage.

8. The precharge circuit of claim 7, wherein the first precharge voltage, the second precharge voltage and the display data are output during the same display line period.

9. The precharge circuit of claim 7, wherein the first precharge voltage, the second precharge voltage and the display data are output to the same data line of a display panel.

10. The precharge circuit of claim 7, wherein the fast precharge circuit outputs the first precharge voltage in a first precharge phase, and the operational amplifier outputs the second precharge voltage in a second precharge phase adjacent to the first precharge phase.

11. The precharge circuit of claim 7, wherein the fast precharge circuit comprises at least one of a switch, a logic gate, a diode-connected transistor, and a current source.

12. The precharge circuit of claim 7, wherein the first precharge voltage and the second precharge voltage are output to more than one terminal among the plurality of output terminals of the data driver.

13. A precharge circuit of a data driver, the data driver outputting a display data to a plurality of output terminals of the data driver, the precharge circuit comprising:

a plurality of precharge units, each comprising:

an operational amplifier to output a precharge voltage to an output terminal among the plurality of output terminals in a first configuration and then output the precharge voltage to the output terminal in a second configuration, prior to the data driver outputting the display data to the output terminal;

wherein a driving capability of the operational amplifier in the first configuration is higher than the driving capability of the operational amplifier in the second configuration.

14. The precharge circuit of claim 13, wherein the precharge voltage and the display data are output during the same display line period.

15. The precharge circuit of claim 13, wherein the precharge voltage and the display data are output to the same data line of a display panel.

16. The precharge circuit of claim 13, wherein the operational amplifier is in the first configuration in a first precharge phase, and in the second configuration in a second precharge phase adjacent to the first precharge phase.

17. The precharge circuit of claim 13, wherein a power amount consumed by the operational amplifier in the first configuration is greater than a power amount consumed by the operational amplifier in the second configuration.

18. The precharge circuit of claim 13, wherein the precharge voltage is output to more than one terminal among the plurality of output terminals of the data driver.

19. A precharge circuit of a data driver, the data driver outputting a display data to a plurality of output terminals of the data driver, the precharge circuit comprising:

a plurality of precharge units, each comprising:

an operational amplifier to output a precharge voltage to an output terminal among the plurality of output terminals prior to the data driver outputting the display data to the output terminal; and a mismatch cancellation circuit, coupled to the operational amplifier, to cancel a mismatch of the operational amplifier between the plurality of precharge units.

20. The precharge circuit of claim 19, wherein the mismatch cancellation circuit is coupled to a first input terminal and a second input terminal of the operational amplifier.

21. The precharge circuit of claim 19, wherein the mismatch cancellation circuit comprises at least one of a chopper, an auto-zeroing circuit, and a trimming circuit.

22. The precharge circuit of claim 19, wherein the precharge voltage is output to more than one terminal among the plurality of output terminals of the data driver.

* * * * *